(12) United States Patent
Ong

(10) Patent No.: US 7,304,948 B1
(45) Date of Patent: Dec. 4, 2007

(54) CONGESTION CONTROL FOR SIGNALLING TRANSPORT PROTOCOLS

(75) Inventor: Lyndon Y. Ong, San Jose, CA (US)

(73) Assignee: Nortel Networks Limited (CA)

( * ) Notice: Subject to any disclaimer, the term of this patent is extended or adjusted under 35 U.S.C. 154(b) by 804 days.

(21) Appl. No.: 09/753,339

(22) Filed: Dec. 29, 2000

(51) Int. Cl.
*H04L 12/56* (2006.01)
*H04J 3/26* (2006.01)

(52) U.S. Cl. .................. 370/230.1; 370/236; 370/477

(58) Field of Classification Search ........ 370/229–236, 370/242, 465, 468, 477
See application file for complete search history.

(56) References Cited

U.S. PATENT DOCUMENTS

| | | | | |
|---|---|---|---|---|
| 6,278,691 B1* | 8/2001 | Ohyama et al. | ............ | 370/235 |
| 6,424,624 B1* | 7/2002 | Galand et al. | ............ | 370/231 |
| 6,560,243 B1* | 5/2003 | Mogul | ............ | 370/468 |
| 6,594,701 B1* | 7/2003 | Forin | ............ | 709/232 |
| 6,625,118 B1* | 9/2003 | Hadi Salim et al. | ....... | 370/229 |
| 6,643,259 B1* | 11/2003 | Borella et al. | ............ | 370/231 |
| 6,745,361 B1* | 6/2004 | Gradischnig | ............ | 714/749 |
| 6,754,228 B1* | 6/2004 | Ludwig | ............ | 370/468 |
| 6,757,248 B1* | 6/2004 | Li et al. | ............ | 370/235 |
| 6,842,424 B1* | 1/2005 | Key et al. | ............ | 370/236 |
| 2001/0032269 A1* | 10/2001 | Wilson | ............ | 709/235 |
| 2002/0181494 A1* | 12/2002 | Rhee | ............ | 370/465 |
| 2005/0041582 A1* | 2/2005 | Hancock et al. | ............ | 370/231 |

* cited by examiner

*Primary Examiner*—Hassan Kizou
*Assistant Examiner*—Ahmed Elallam
(74) *Attorney, Agent, or Firm*—McGuiness + Manaras LLP

(57) ABSTRACT

A transport layer protocol such as the Stream Control Transmission Protocol uses a new traffic control technique instead of the TCP slow start algorithm. The procedure assumes that the network on which it is implemented has a fixed bandwidth assigned for the connection, and that the allotted bandwidth roughly matches the traffic load. Based on this, under message loss conditions it is only necessary to ensure that signaling traffic emitted into the network by the sender is no greater than the fixed bandwidth that has been allocated to the connection. That is, retransmissions take bandwidth away from a fixed allocation that has been made for the connection, but do not cause the connection itself to reduce the overall traffic it generates into the network; rather, it maintains the same traffic level. This technique prevents congestion in the network from increasing when message loss occurs; at the same time it does not reduce bandwidth for the association as rapidly as the slow start procedure.

5 Claims, 3 Drawing Sheets

CONGESTION CONTROL FOR SIGNALLING TRANSPORT PROTOCOLS

FIELD OF THE INVENTION

The present invention is directed to digital communications networks. More specifically, the invention is directed to digital communications networks such as private networks operated under relatively controlled conditions compared to public networks such as the Internet, and in particular is directed to such private networks in which bandwidth access by applications can be controlled.

BACKGROUND OF RELATED ART

As noted above, the Transmission Control Protocol/Internet Protocol (TCP/IP) is a frequently used transport/network layer protocol of digital communications networks such as the Internet. The TCP protocol is held to have a relatively reliable data transport protocol. That is, a sending system can detect whether data has been successfully received at its destination and if not, can take steps to ensure that it is. Once a packet arrives at its destination, the receiving system sends an acknowledgement (ACK) message for that packet back to the sender. When the sender receives the ACK message, it knows that the original packet was safely received.

Often, however, a packet will be corrupted in transmission. This may be due to a noisy transmission channel or some other reason. Further, although the packet may properly reach its destination, the ACK message sent in return may not be received by the sender for similar reasons.

Similarly, a packet sent from the sending system or its return ACK message may be lost in transit. This communication problem can be detected by establishing a time period which begins when each packet is sent. If a corresponding ACK message is not received within that time period, the packet is resent.

In any case, the TCP protocol attempts to remedy the communication problem by resending the packet. If a proper ACK message still is not received, the packet is sent repeatedly, at ever-increasing intervals, until a proper ACK is received or an application timeout value is exceeded.

Although this retransmission feature provides a valuable data integrity function, it does so at the expense of bandwidth. That is, each retransmitted packet sent by the TCP layer occupies a segment of bandwidth that could have carried a new packet. When the number of retransmissions is small, the lost bandwidth is negligible and system performance is not significantly affected. As the number of retransmissions rises to become a significant portion of the connection traffic, perhaps with multiply-retransmitted packets, effective connection traffic becomes a small percentage of its maximum value. This condition is known as congestion collapse.

To prevent such occurrences, four related algorithms, slow start, congestion avoidance, fast recovery and fast retransmit have been incorporated into TCP/IP. The first, slow start, is implemented so that a newly established connection does not overwhelm the network by generating more additional traffic than the network can absorb on a specific route. Slow start represents flow control by the source for the purpose of maintaining network stability. A sliding window protocol achieves flow control by the receiver for the purpose of minimizing the loss of data caused by buffer overflow.

More specifically, for each connection TCP remembers the size of the receiver's window rwnd as provided in ACK messages and a limit cwnd called the congestion window. The congestion window cwnd is a sender-side limit on the amount of data the sender can transmit into the network before receiving an ACK message. The sender's window is always the minimum of the receiver's window (the size of the receiver's buffer, i.e., the amount of new traffic it can accommodate) rwnd and the congestion window cwnd. At non-congested steady state, the receiver window and congestion window are the same size. In congested conditions, reducing the congestion window reduces the traffic the TCP layer will inject into the connection.

Whenever a TCP connection loses a packet, receives a corrupt packet or the like, this may represent the onset of a congestion condition. In this case, the sender reduces the congestion window cwnd by half, to a minimum of a single segment. A slow start threshold variable ssthresh will be set with this value; specifically, ssthresh=max{2, min {cwnd/2, rwnd}}. For segments that remain in the allowed window, the retransmission timer will be decreased exponentially upon continued failures. Since the reduction in the congestion window is half for each loss, it shrinks quickly and becomes exponential with continued loss.

When congestion ends, i.e., a certain number of ACK messages are received in a row or some other criteria are satisfied, the TCP protocol begins the slow start procedure. Here, the congestion window will be started at the size of a single segment and will be increased by one segment each time an acknowledgement arrives; that is, two packets are added to the allowable window for every ACK message received. This continues until the window is equal to ssthresh. Afterwards, slow start ends and the second procedure, collision avoidance, begins in which the window is increased by one packet for each packet for which an ACK is received.

While the slow start procedure provides an effective way for avoiding collision collapse conditions, the transmission rate is cut drastically upon loss of a packet. This may be acceptable if the goal is conservative use of a public network; however, it is less than preferable for a private network in which access to bandwidth by applications can be controlled. This is because, e.g., a private network may be able to be more aggressive due to its relatively controlled environment; public platforms must ramp up from a relatively low level due to the unknown nature of sources delivering information to the network.

That is, in a public network the number of users trying to send information at one time cannot be controlled; thus, the chance of users overloading the network during busy periods is significant. In a private network, on the other hand, the number of users can be controlled, further, information about the bandwidth those users will need is available. Thus, it may be possible to predict in advance the level of traffic and size of the network needed, so the danger of congestion is significantly less. In, e.g., signaling networks such as SS7, the "users" are telephone switches and the number of these and bandwidth that they use for signaling is predictable.

Also, when using it to control the flow of data into a newly-opened connection, traffic cannot ramp up to the desired rate as quickly as possible. Further, if, for example, two connections are used for redundancy, when one path fails it is not possible to immediately transfer the full traffic load to the other path—it is necessary to go through the slow start process.

This is particularly evident in a redundant network having a primary and a backup link. If the primary fails, because of slow start all of the traffic cannot immediately be transferred to the backup. Instead, traffic can be increased on the backup only at the rate allowed by slow start, even if the network is pre-configured to allow some reserve bandwidth for the backup link.

SUMMARY OF THE INVENTION

A transport layer protocol such as the Stream Transmission Protocol (SCTP), instead of using a congestion control procedure similar to slow start, makes use of a new traffic control technique. The procedure assumes that the network on which it is implemented has a fixed bandwidth assigned for the connection, and that the allotted bandwidth roughly matches the traffic load. Based on this, under message loss conditions network collapse may be avoided if signaling traffic emitted into the network by the sender is no greater than the fixed bandwidth that has been allocated to the connection.

That is, retransmissions take bandwidth away from a fixed allocation that has been made for the connection, but do not cause the connection itself to reduce the overall traffic it generates into the network; rather, it maintains the same traffic level. This technique prevents congestion in the network from increasing when message loss occurs; at the same time it does not reduce bandwidth for the association as rapidly as the slow start procedure.

Further, the mechanism allows for some potential network congestion situations where the source reduces traffic to a minimal rate, but notifies the application that congestion has occurred and allows the application to decide what messages should be given priority for transmission in a congested situation.

BRIEF DESCRIPTION OF THE DRAWINGS

These and other features of the present invention are better understood by reading the following detailed description of an embodiment thereof, taken in conjunction with the accompanying drawings, in which.

DETAILED DESCRIPTION OF EMBODIMENTS

A preferred embodiment of the present invention uses the Stream Control Transmission Protocol (SCTP) rather than TCP as the preferred transport layer protocol. SCTP is another protocol that can be implemented in the transport layer. Like TCP, SCTP provides a reliable transport service, ensuring that data is transported across the network without error and in sequence. Like TCP, SCTP is a connection-oriented mechanism, meaning that a relationship is created between the endpoints of an SCTP session prior to data being transmitted, and this relationship is maintained until all data transmission has been successfully completed. Unlike TCP, SCTP provides a number of functions that are considered important for signaling transport (although TCP provides signaling transport functionality, it is relatively lacking in robustness and performance), and which at the same time can provide transport benefits to other applications requiring additional performance and reliability relative to TCP.

For example, SCTP supports multiple paths for transmission, so that traffic can be switched to an alternate path if the primary path is blocked or congested. Also, TCP is known to have a problem where a dropped message causes all subsequently received messages to be delayed until the dropped one is successfully retransmitted. This is called "head-of-line blocking" and is bad for signaling because only signaling messages related to the same call or trunk as the dropped message really need to be delayed or kept in sequence; other messages that deal with other calls or trunks can be delivered without waiting. Performance analysis has determined that TCP causes significant additional delay in transmitting signaling messages because of head-of-line blocking. Also, TCP does not identify message boundaries—it is designed to transmit a byte stream. In contrast, SCTP is designed to transmit messages and identifies the message boundaries.

For the purposes of the present invention, it may be assumed that the congestion control algorithms used by SCTP are substantially similar to those used by TCP. Motivated readers are directed to Section 7.1 of RFC 2960, "Stream Control Transmission Protocol", which explains the relatively minor differences therebetween.

Like TCP, SCTP uses a receiver window size rwnd to denote the available buffer space in a receiver receiving the data transmission being protected; a congestion control window size cwnd which is a sender-side limit on the amount of data the sender can transmit into the network before receiving an ACK message, and which is adjusted to reflect network environmental conditions as described below; and a slow start threshold ssthresh used by the sender to distinguish between slow start and collision avoidance phases of congestion control.

Figure 1A:
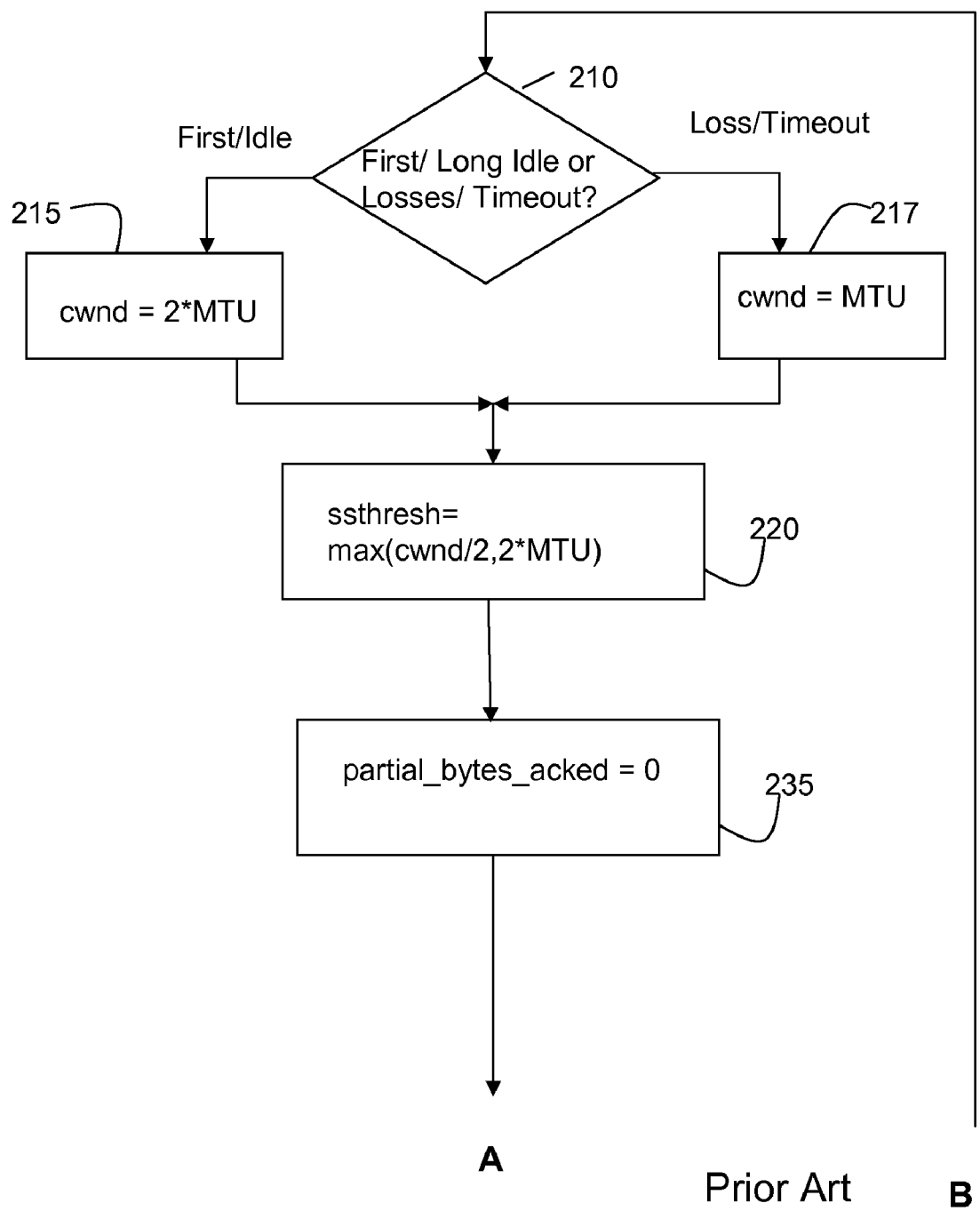
FIGS. 1A and 1B are a flowchart of slow start and collision avoidance techniques implemented in a TCP or SCTP protocol as known in the art.
Figure 1B:
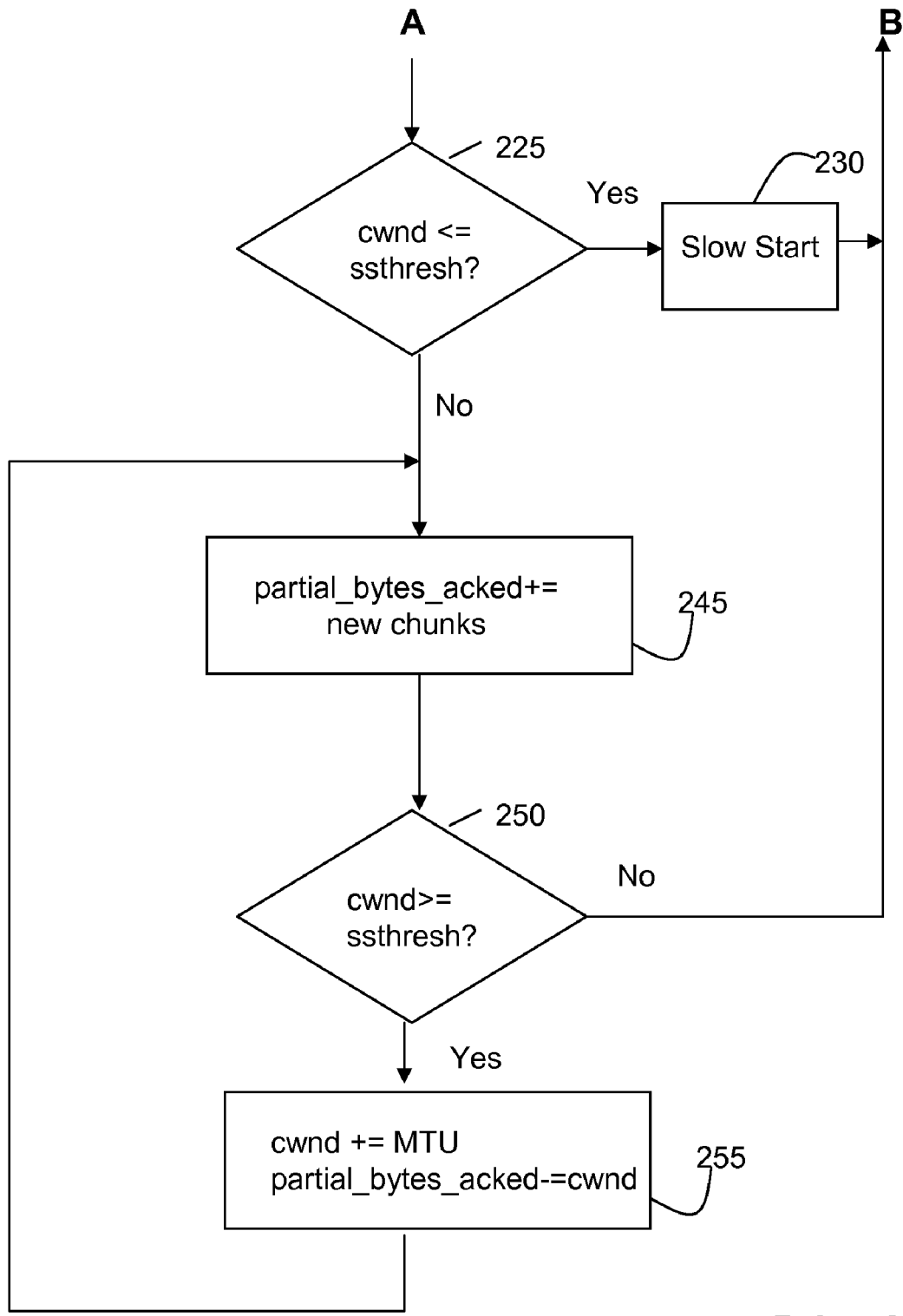

FIGS. 1A-1B show the start of data transmission with congestion control tuner SCTP. This may be, for example, upon establishment of a new connection in a network, after a sufficiently long idle period, after traffic reduction, or the like. First, in 210, the system decides whether the data transmission is being done before first data transmission or after a long idle period, or upon detection of packet losses or after a retransmission timeout. If the former, the congestion window size cwnd is set to not more than twice the maximum transmission unit (MTU) size in 215. If the latter, in 217 the congestion window size is set to not more than the MTU size.

As used herein, an MTU is the maximum sized packet that the network will transmit without having to do IP fragmentation, which causes a great deal of delay because of the need to reassemble and refragment at every router in a transmission path. Generally, cwnd is set to some multiple of MTU since sending messages around an MTU size means that packets are an efficient length—not lots of small packets, but not so large that they must be fragmented.

In 220, the slow start threshold ssthresh is set to a relatively large number, e.g., to max(cwnd/2, 2*MTU) to ensure that congestion avoidance begins with the slow start procedure.

In the main loop beginning at 225, the system determines whether cwnd is less than or equal to ssthresh. If cwnd<=ssthresh, the slow start algorithm is used to increase cwnd at 230, where when the system receives a non-duplicative ACK message, cwnd is increased by no more than the lesser of the size of the data packets acknowledged by the ACK, and the destination path's MTU.

If cwnd>ssthresh, congestion avoidance is implemented by incrementing cwnd by one MTU per RTT, i.e., the round trip time or delay time for a message and its acknowledgement if the sender has cwnd or more bytes outstanding for the receiver. The current SCTP procedure also takes into account that each packet consists of possibly multiple data chunks, each of which contains a signaling message (by combining multiple short messages into one packet, some efficiency of transmission is gained).

In 235, a state variable partial_bytes_acked is initialized to zero for the SCTP communication session. Whenever cwnd is greater than ssthresh in 240, partial_bytes_acked is increased by the total number of bytes of all new chunks acknowledged by a non-duplicative acknowledgement message upon its arrival in 245. When in 250 partial_bytes_acked is greater than or equal to cwnd and before the arrival of the acknowledgement message the sender had cwnd or more bytes of data outstanding, 255 increases cwnd by MTU and resets partial_bytes_acked to (partial_bytes_acked-cwnd).

Conceptually, the above process is deducting acknowledged bytes from the number counted to be in transit, and using the rate at which acknowledgements for these bytes are being received to control the congestion window that controls how fast new bytes can be sent out.

Now, consider the possible changes that could be made to the above congestion control techniques if one assumes that the data transmission is not over a public communication network such as the Internet, but instead is implemented on a private IP network having more controlled conditions. Compared to open networks such as the Internet, such networks are relatively closed and structured. In such private networks it may be possible to determine a good estimate of what sources and destinations there will be on the network, how much traffic they will be generating and receiving, and the like. In such cases, when the behavior of sources can be anticipated or controlled to regulate the amount of traffic on the network, it is possible to avoid congestion by making end-to-end connections look like fixed bandwidth pipes where the total bandwidth allocated to these connections stays within the limits of the bandwidth available in the network.

For example, if all sources control at the rate at which they send traffic into the network, the network should be able to avoid congestion unless there is some significant event such as loss of a node or link. In contrast, the open Internet includes a variable number of traffic sources which attempt to maximize their use of available bandwidth by increasing their rate of sending until they detect congestion, then backing off.

Figure 2:
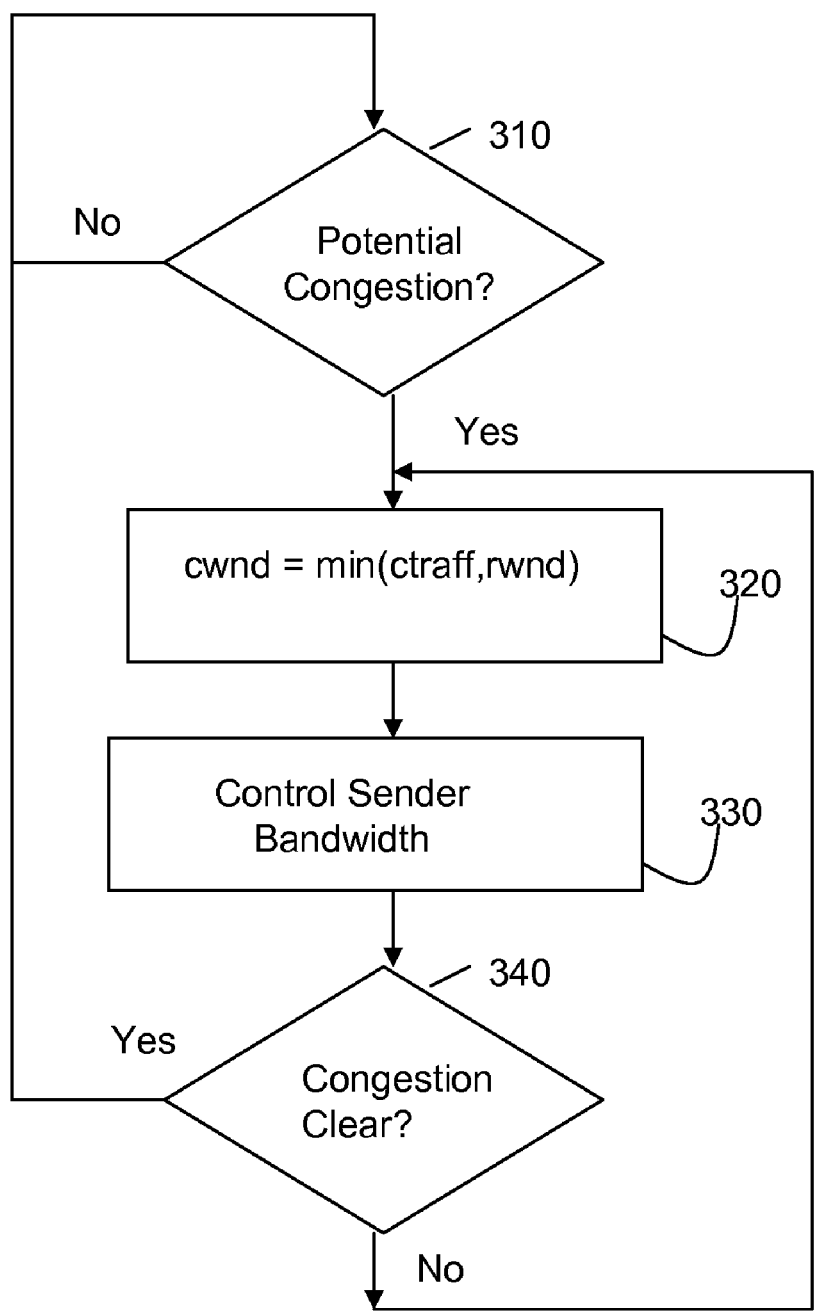
FIG. 2 is a flowchart of a congestion control technique according to a preferred embodiment of the present invention.

FIG. 2 shows a preferred embodiment of the present invention which leverages these assumptions to implement a congestion control technique that may compare favorably to TCP/SCTP slow-start and congestion avoidance. Here, 310 checks to see if a potential congestion condition is present, based on examination of the send buffer occupancy compared to some upper congestion onset threshold; if so, 320 sets the state variable cwnd to the lesser of ctraff, the current amount of unacknowledged traffic, including retransmissions, emitted by the sender into the network (ctraff is a count maintained by the sender), and rwnd, the current receiver buffer size, i.e., cwnd=min{ctraff, rwnd}. Then, in 330 the sender is controlled so that the amount of unacknowledged traffic, including retransmissions, emitted by the sender into the network ctraff does not exceed cwnd. At this time the application is also notified of congestion onset so that it can make decisions about future submission of data for transmission, especially reducing this to only essential messages such as network management message.

340 checks to see if the potential congestion condition is gone by monitoring whether the send buffer occupancy drops below a lower congestion end threshold and, if not, makes another pass therethrough. The same calculation of partial_bytes_acked applies in order to measure data acknowledged by the receiver in chunks. The congestion end threshold is kept somewhat lower than the congestion onset threshold to allow for some hysteresis effect and avoid oscillation into and out of a congestion condition.

The above procedure effectively controls the bandwidth of the association to be no more than the lesser of the unacknowledged traffic at the time of potential congestion detection and the receiver buffer size. It is assumed that under non-congestion conditions, the bandwidth available will at least match the traffic load plus occasional retransmission of lost or corrupted packets because the communication is effectively over a constant bandwidth pipe, so no special congestion control is applied under non-congested conditions, i.e., send buffer occupancy does not exceed the onset threshold. In this way, congestion control can be implemented without the ramping up and sudden cutback typically seen in TCP-style slow start and congestion avoidance congestion control techniques. Reaction to real congestion is generally limited to cases where the bandwidth normally available to support the association is reduced because of some failure condition that is relatively rare. The sender continues to send retransmissions as needed; however, these will only take away from the estimated bandwidth allotted for the connection, and the association can maintain its usual rate of traffic generation into the network.

Thus, with the above-described embodiment the TCP slow start ramp up of traffic is avoided and traffic may be sent immediately at the assigned rate as long as the send buffer occupancy does not increase above the onset threshold, which would indicate congestion on the alternate path.

The methods and implementing apparatus of the present invention have been described in connection with the preferred embodiments as disclosed herein. Although exemplary embodiments of the present invention have been shown and described in detail herein, along with certain variants thereof, other varied embodiments which incorporate the teachings of the invention may easily be constructed by those skilled in the art.

For example, the preferred embodiment of the present invention is implemented using the SCTP transport protocol; however, other protocols such as TCP may be used as well. Further, the above-described embodiments may be implemented in a number of ways, including the use of dedicated hardware, a combination of dedicated hardware and programmed special purpose processors, programmed general purpose processors or software, and the like.

Accordingly, the present invention is not intended to be limited to the specific form set forth herein, but on the contrary, it is intended to cover such alternatives, modifications, and equivalents, as can be reasonably included within the spirit and scope of the invention. In other instances, well known structures are not shown in detail but can readily constructed by those skilled in the art.

What is claimed is:

1. A method of controlling congestion in a communications network, the method comprising:

detecting a network congestion condition on one of a plurality of connections between a sender and a receiver in the communications network, the plurality of connections providing an association between the sender and receiver and having a desired fixed bandwidth, the network congestion condition detected in response to an occupancy threshold of a transmit buffer of the sender; and upon detection of the network congestion condition, controlling new traffic emitted into the communications network to not exceed the lesser of a current amount of unacknowledged traffic emitted by the sender into the communications network at a time of detection of the congestion condition, and a current receiver buffer size at that time.

2. The method of claim 1, wherein the network is a private network, and wherein a total bandwidth of the private network is allocated among a plurality of connections between a plurality of nodes in the private network to provide a desired fixed bandwidth for each connection, and wherein the step of controlling new traffic maintains the desired fixed bandwidth on the connection.

3. A method of controlling congestion in a communications network, the method comprising:

detecting a congestion condition in one of a plurality of connections that associate a source node and a receiving node in the communications network, the association having a desired bandwidth; and upon detection of the congestion condition, controlling new traffic emitted into the communications network to be no more than the lesser of a current unacknowledged traffic load at the source node of the network at the time of detection and a receive buffer size of the receiving node.

4. The method of claim 3, wherein the network is a private network, and wherein a total bandwidth of the private network is allocated among a plurality of associations between a plurality of nodes in the private network to provide a desired bandwidth for each association, and wherein the step of controlling new traffic maintains the desired bandwidth for each association.

5. A method of controlling congestion in a communications network, the method comprising:

determining whether a congestion condition is present in one of a plurality of connections that associate a sending node and a receiving node in response to an occupancy threshold of a transmit buffer of the sending node in the communications network;

when a congestion condition is present, setting a congestion window size to a prescribed value, wherein the prescribed value is the lesser of a current amount of unacknowledged traffic emitted by the sending node into the network at a time of detection of the congestion condition, and a current receiver buffer size at that time; and controlling traffic from the sending node delivered into the communications network on the plurality of connections so that the amount of unacknowledged traffic from the sending node does not exceed the congestion window size.

* * * * *